United States Patent
Kuo

(10) Patent No.: US 12,295,049 B1
(45) Date of Patent: May 6, 2025

(54) METHOD AND APPARATUS FOR HANDLING SIDELINK RADIO BEARER (SLRB) MAPPING CONFIGURATION RELEASE IN A WIRELESS COMMUNICATION SYSTEM

(71) Applicant: ASUS Technology Licensing Inc., Taipei (TW)

(72) Inventor: Richard Lee-Chee Kuo, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/937,674

(22) Filed: Nov. 5, 2024

Related U.S. Application Data

(60) Provisional application No. 63/555,275, filed on Feb. 19, 2024.

(51) Int. Cl.
*H04W 76/10* (2018.01)
*H04W 76/27* (2018.01)
*H04W 88/04* (2009.01)

(52) U.S. Cl.
CPC .......... *H04W 76/10* (2018.02); *H04W 76/27* (2018.02); *H04W 88/04* (2013.01)

(58) Field of Classification Search
CPC ...... H04W 76/10; H04W 76/27; H04W 88/04
See application file for complete search history.

(56) References Cited

U.S. PATENT DOCUMENTS

2022/0338092 A1* 10/2022 Wang .................. H04W 72/02

FOREIGN PATENT DOCUMENTS

EP 4366460 5/2024

OTHER PUBLICATIONS

Huawei, HiSilicon, "Report of [Post125][417][Relay] Rel-18 relay RRC open issues (Huawei)", Agenda Item 7.9.3, R2-240xxxx, 3GPP TSG-RAN WG2 Meeting #125bis, Changsha, China, Apr. 15-19, 2024.

* cited by examiner

*Primary Examiner* — Diane D Mizrahi
(74) *Attorney, Agent, or Firm* — Blue Capital Law Firm, P.C.

(57) ABSTRACT

A method and device for a source relay User Equipment (UE) are disclosed. In one embodiment, the relay UE establishes a first PC5 Radio Resource Control (RRC) connection with a source remote UE and establishes a second PC5 RRC connection with a target remote UE. The relay UE further receives a PC5 Quality of Service (QoS) flow-to-Sidelink Radio Bearer (SLRB) mapping from the source remote UE, wherein the PC5 QoS flow-to-SLRB mapping includes a configuration index of an End-to-End (E2E) SLRB and at least one sidelink QoS flow identity (ID). The relay UE also transmits a configuration of a PC5 Relay Radio Link Control (RLC) channel to the target remote UE, wherein the E2E SLRB is associated with the PC5 Relay RLC channel. Furthermore, the relay UE receives first information, indicating release of the PC5 QoS flow-to-SLRB mapping, from the source remote UE.

16 Claims, 10 Drawing Sheets

METHOD AND APPARATUS FOR HANDLING SIDELINK RADIO BEARER (SLRB) MAPPING CONFIGURATION RELEASE IN A WIRELESS COMMUNICATION SYSTEM

CROSS-REFERENCE TO RELATED APPLICATIONS

The present Application claims the benefit of U.S. Provisional Patent Application Ser. No. 63/555,275 filed on Feb. 19, 2024, the entire disclosure of which is incorporated herein in its entirety by reference.

FIELD

This disclosure generally relates to wireless communication networks, and more particularly, to a method and apparatus for handling Sidelink Radio Bearer (SLRB) mapping configuration release in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for a source relay User Equipment (UE) are disclosed. In one embodiment, the relay UE establishes a first PC5 Radio Resource Control (RRC) connection with a source remote UE and establishes a second PC5 RRC connection with a target remote UE. The relay UE further receives a PC5 Quality of Service (QoS) flow-to-Sidelink Radio Bearer (SLRB) mapping from the source remote UE, wherein the PC5 QoS flow-to-SLRB mapping includes a configuration index of an End-to-End (E2E) SLRB and at least one sidelink QoS flow identity (ID). The relay UE also transmits a configuration of a PC5 Relay Radio Link Control (RLC) channel to the target remote UE, wherein the E2E SLRB is associated with the PC5 Relay RLC channel. Furthermore, the relay UE receives first information, indicating release of the PC5 QoS flow-to-SLRB mapping, from the source remote UE. In addition, the relay UE transmits second information, indicating release of the PC5 Relay RLC channel, to the target remote UE if there is no other E2E SLRB associated with the PC5 Relay RLC channel.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 38.300 V18.0.0, "NR; NR and NG-RAN Overall Description; Stage 2 (Release 18)"; TS 38.331 V18.0.0, "NR; Radio Resource Control (RRC) protocol specification (Release 18)"; and RIL H693. The standards and documents listed above are hereby expressly incorporated by reference in their entirety.

Figure 1:
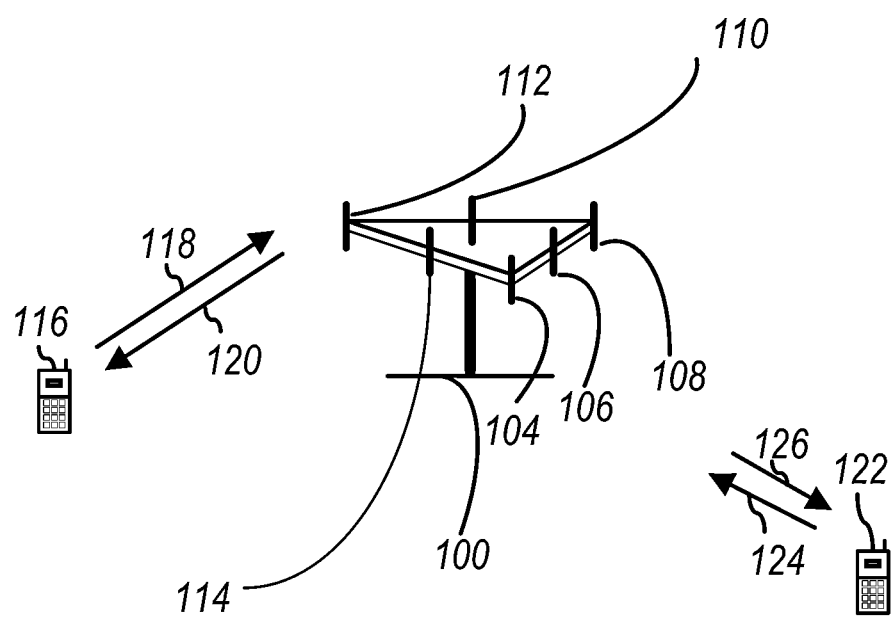
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
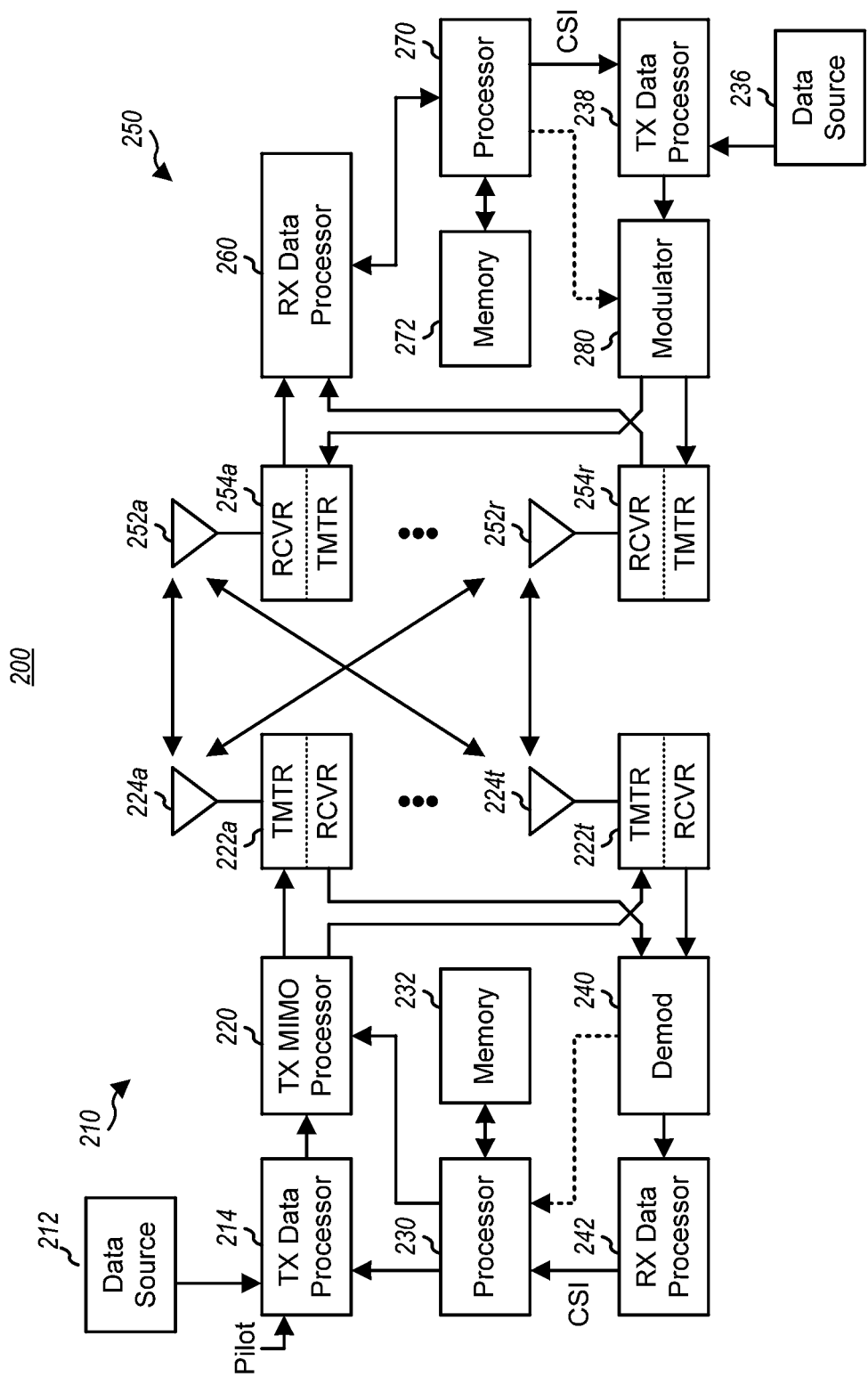
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
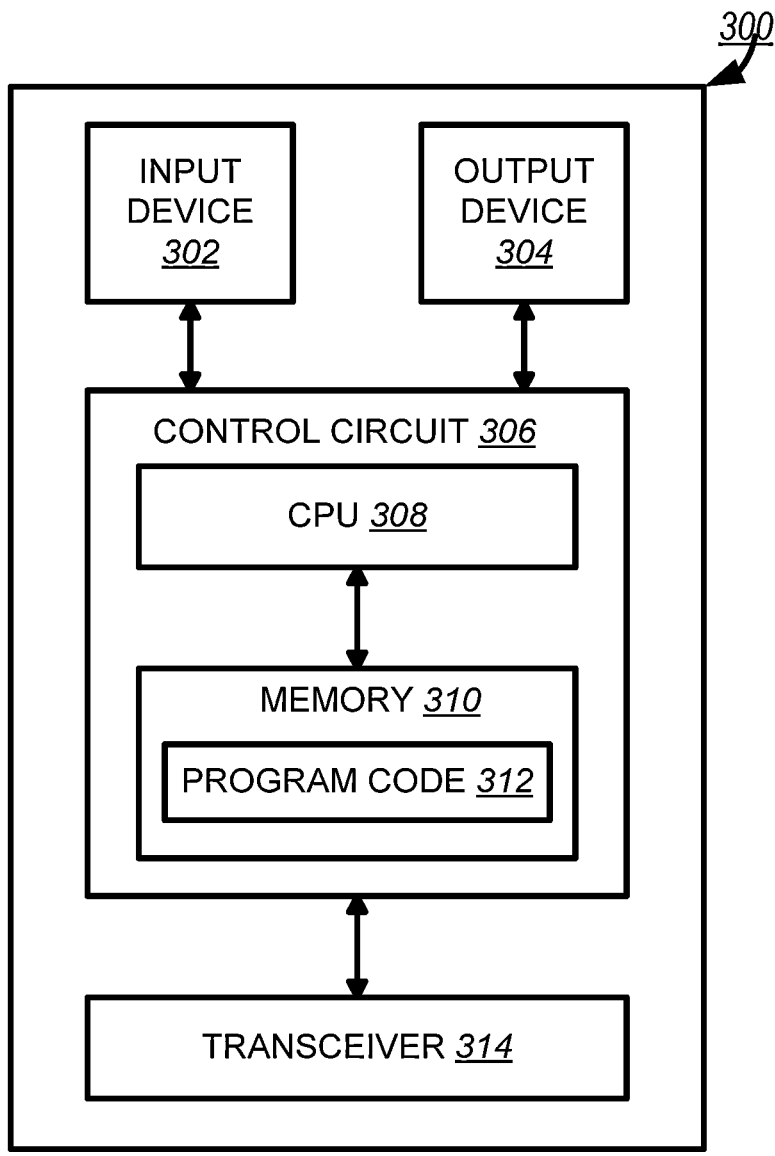
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
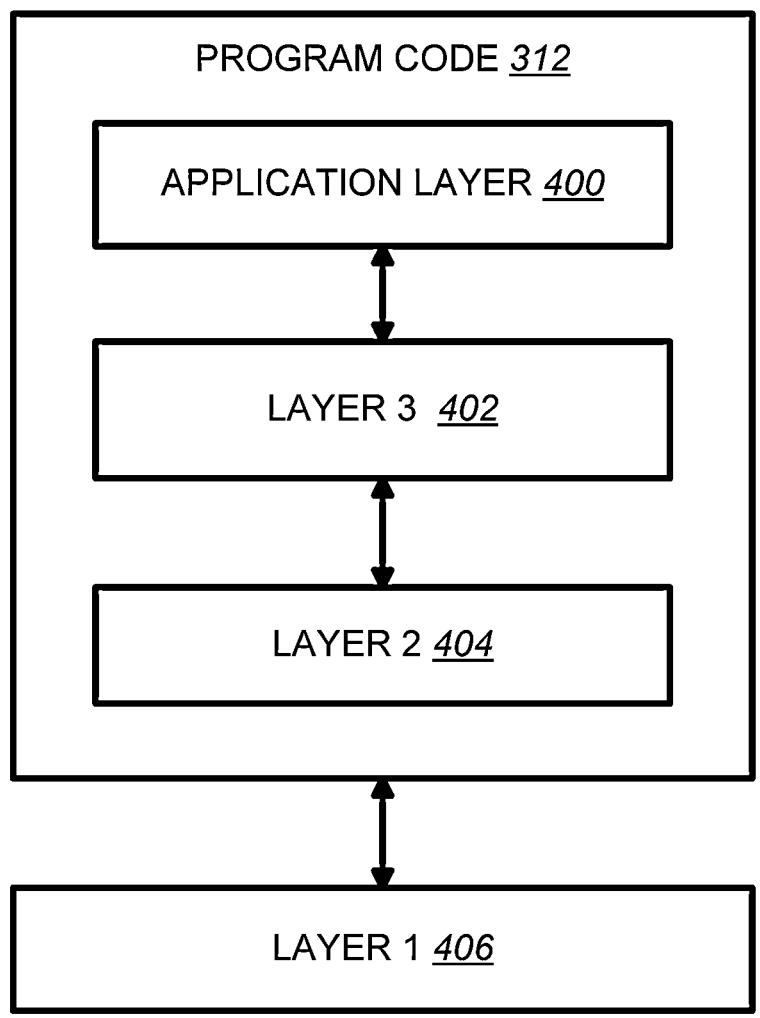
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP Stage 2 specification (TS 38.300) for Release 18 specifies Layer-2 UE-to-UE (L2 U2U) Relay as follows:

16.12 Sidelink Relay 16.12.1 General

Sidelink relay is introduced to support 5G ProSe UE-to-Network Relay (U2N Relay) function (specified in TS 23.304 [48]) to provide connectivity to the network for U2N Remote UE(s). Both L2 and L3 U2N Relay architectures are supported. The L3 U2N Relay architecture is transparent to the serving NG-RAN of the U2N Relay UE, except for controlling sidelink resources. The detailed architecture and procedures for L3 U2N Relay can be found in TS 23.304 [48]. A U2N Relay UE shall be in RRC_CONNECTED to perform relaying of unicast data. For L2 U2N Relay operation, the following RRC state combinations are supported:

Both L2 U2N Relay UE and L2 U2N Remote UE shall be in RRC_CONNECTED to perform transmission/reception of relayed unicast data; and The L2 U2N Relay UE can be in RRC_IDLE, RRC_INACTIVE or RRC_CONNECTED as long as all the L2 U2N Remote UE(s) that are connected to the L2 U2N Relay UE are either in RRC_INACTIVE or in RRC_IDLE.

A single unicast link is established between one L2 U2N Relay UE and one L2 U2N Remote UE. The traffic to the NG-RAN of L2 U2N Remote UE via a given L2 U2N Relay UE and the traffic of the L2 U2N Relay UE shall be separated in different Uu RLC channels.

For L2 U2N Relay, the L2 U2N Remote UE can only be configured to use resource allocation mode 2 (as specified in 5.7.2 and 16.9.3.1) for data to be relayed.

Sidelink relay is introduced to support 5G ProSe UE-to-UE Relay (U2U Relay) function (specified in TS 23.304 [48]) to provide connectivity between U2U Remote UEs. Both L2 and L3 U2U Relay architectures are supported. The L3 U2U Relay architecture is transparent to the AS layer of the U2U Relay UE. The detailed architecture and procedures for L3 U2U Relay can be found in TS 23.304 [48].

A U2U Relay UE is to support the U2U Relay function as specified in TS 23.304 [48] to provide coverage extension of the sidelink transmissions between two U2U Remote UEs. For the coverage extension, the U2U Remote UE can communicate with the peer U2U Remote UE(s) which are not reachable within the sidelink coverage.

The U2U Relay UE and U2U Remote UE can be in any RRC state. The U2U Relay UE and the U2U Remote UEs can be in the coverage of different cells or out-of-coverage. Both sidelink resource allocation modes, i.e., mode 1 and mode 2 are supported for the U2U Relay UE and U2U Remote UEs. For U2U Relay, NR sidelink is supported between U2U Relay UE and U2U Remote UEs. After NR sidelink establishment between U2U Relay UE and U2U Remote UEs, end-to-end PC5 unicast link connection establishment is performed between U2U Remote UEs. Only unicast is supported between U2U Relay UE and U2U Remote UEs.

[ . . . ]

16.12.2.2 L2 UE-to-UE Relay

The protocol stacks for the user plane and the control plane of the L2 U2U Relay architecture are illustrated in FIG. 16.12.2.2-1 and FIG. 16.12.2.2-2. The SRAP sublayer is placed above the RLC sublayer for both CP and UP at both PC5 interfaces. The sidelink SDAP, PDCP and RRC are terminated between two L2 U2U Remote UEs (i.e., end-to-end), while SRAP, RLC, MAC and PHY are terminated in each hop of PC5 link.

Figure 5:
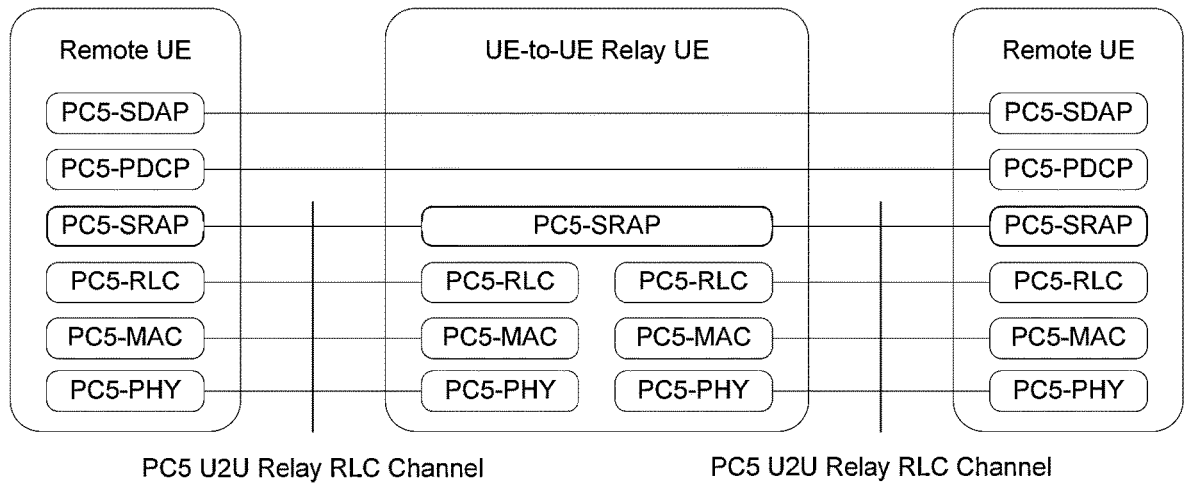
FIG. 5 is a reproduction of FIG. 16.12.2.2-1 of 3GPP TS 38.300 V18.0.0.

FIG. 16.12.2.2-1 of 3GPP TS 38.300 V18.0.0, Entitled "User Plane Protocol Stack for L2 UE-to-UE Relay", is Reproduced as FIG. 5

Figure 6:
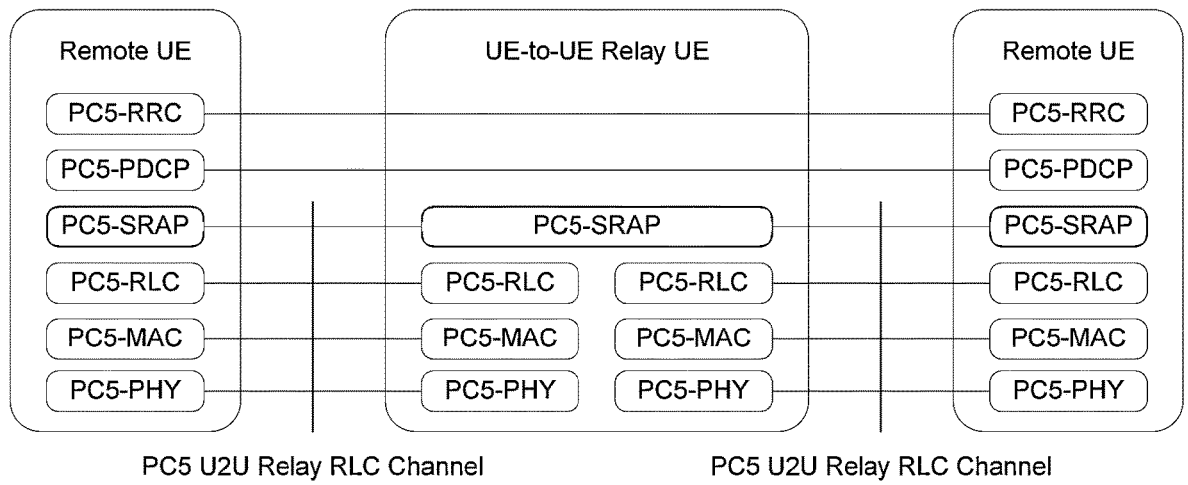
FIG. 6 is a reproduction of FIG. 16.12.2.2-2 of 3GPP TS 38.300 V18.0.0.

FIG. 16.12.2.2-2 of 3GPP TS 38.300 V18.0.0, Entitled "Control Plane Protocol Stack for L2 UE-to-UE Relay", is Reproduced as FIG. 6

For L2 UE-to-UE Relay, the SRAP sublayer at L2 U2U Remote UE:

The SRAP sublayer at L2 U2U Remote UE performs bearer mapping between end-to-end PC5 Radio Bearers (SL-SRBs or SL-DRBs) of the L2 U2U Remote UE and at each hop of PC5 Relay RLC Channel between the L2 U2U Remote UE and the L2 U2U Relay UE.

For the traffic transmitted from an L2 U2U Remote UE to an L2 U2U Relay UE, the different end-to-end PC5 Radio Bearers (SL-SRBs or SL-DRBs) towards the same peer L2 U2U Remote UE and/or different peer L2 U2U Remote UEs can be multiplexed to the same PC5 Relay RLC channel, which is between the L2 U2U Remote UE(s) and the L2 U2U Relay UE.

For the traffic received at L2 U2U Remote UE, the same PC5 Relay RLC channel from one L2 U2U Relay UE can be de-multiplexed to the different end-to-end PC5 Radio Bearers (SL-SRBs or SL-DRBs) of the same peer L2 U2U Remote UE and/or different peer L2 U2U Remote UEs.

The SRAP sublayer at L2 U2U Remote UE supports identification of the peer L2 U2U Remote UE and itself. The local IDs are assigned by L2 U2U Relay UE to both L2 U2U Remote UEs for identification. For the two local IDs, one of them identifies L2 U2U Remote UE and the other identifies the peer L2 U2U Remote UE. The local ID of the peer L2 U2U Remote UE and the local ID of L2 U2U Remote UE are delivered by L2 U2U Relay UE to the L2 U2U Remote UEs along with the corresponding L2 ID of the peer L2 U2U Remote UE. The identity information of the end-to-end PC5 Radio Bearer and two local IDs are included in the SRAP header in order for the peer L2 U2U Remote UE to correlate the received packets for the specific PDCP entity associated with the right end-to-end PC5 Radio Bearer of the L2 U2U Remote UEs.

For L2 UE-to-UE Relay, the SRAP sublayer at L2 U2U Relay UE:

The SRAP sublayer at L2 U2U Relay UE determines the egress PC5 Relay RLC Channel based on the mapping of the end-to-end PC5 Radio Bearer and egress PC5 Relay RLC Channel for a particular pair between the L2 U2U Remote UE and the peer L2 U2U Remote UE.

For the ingress traffic received from an/multiple L2 U2U Remote UE(s) at L2 U2U Relay UE, the different end-to-end PC5 Radio Bearers (SL-SRBs or SL-DRBs) of the same L2 U2U Remote UE and/or the same/different end-to-end PC5 Radio Bearers (SL-SRBs or SL-DRBs) of L2 U2U Remote UEs can be multiplexed to the same egress PC5 Relay RLC channel, which is in between the L2 U2U Relay UE and the peer L2 U2U Remote UE. [ . . . ]

16.12.7 Control Plane Procedures for L2 U2U Relay

The L2 U2U Remote UE needs to establish end-to-end SL-SRB/DRBs with the peer L2 U2U Remote UE before user plane data transmission.

Figure 7:
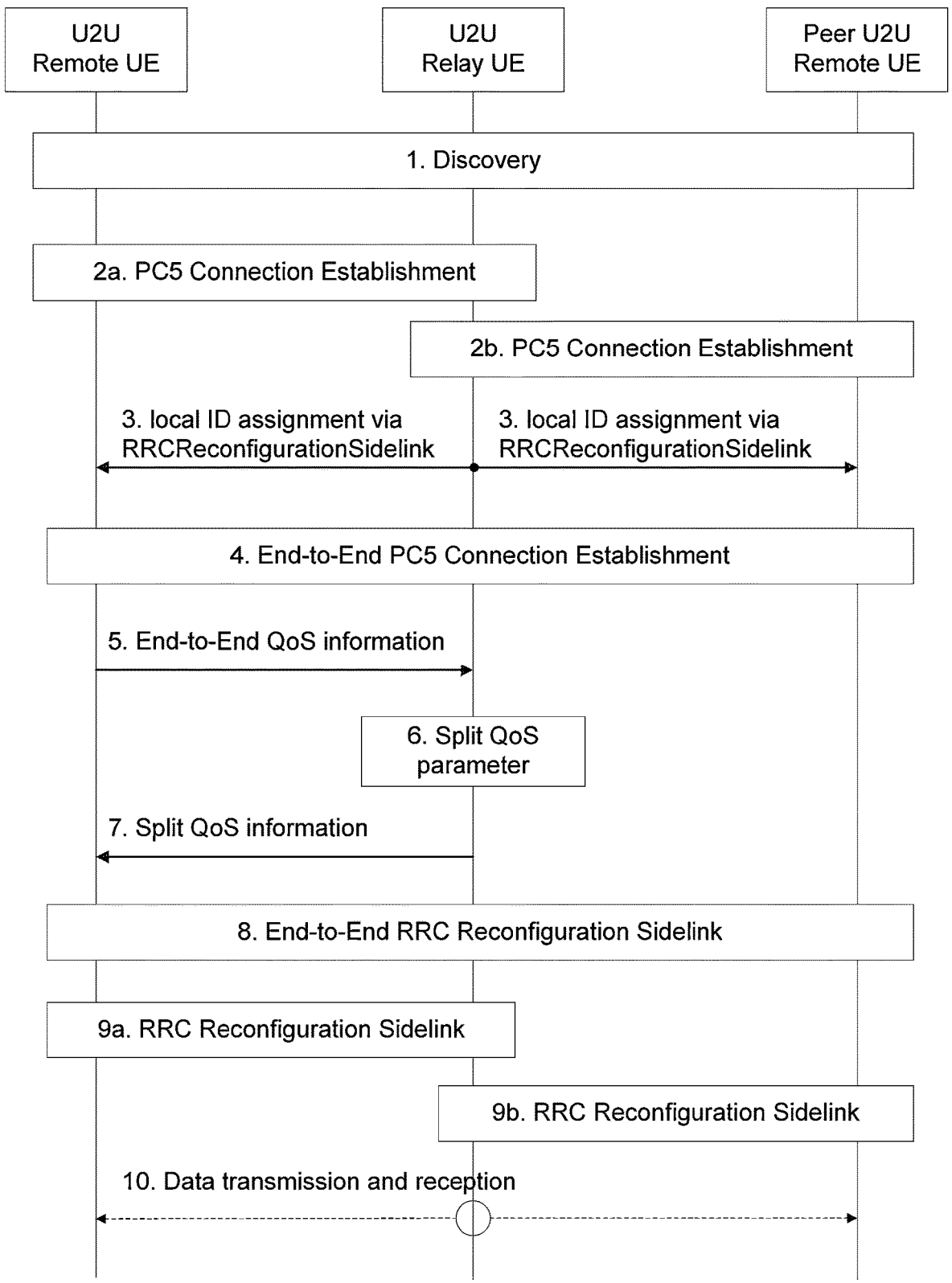
FIG. 7 is a reproduction of FIG. 16.12.7-1 of 3GPP TS 38.300 V18.0.0.

The following high level connection establishment procedure in FIG. 16.12.7-1 applies to a L2 U2U Relay UE and L2 U2U Remote UE:

FIG. 16.12.7-1 of 3GPP TS 38.300 V18.0.0, Entitled "Procedure for L2 U2U Remote UE Connection Establishment", is Reproduced as FIG. 7

1. The L2 U2U Remote UE, L2 U2U Relay UE, and peer L2 U2U Remote UE perform discovery procedure or integrated discovery procedure.
2a. The L2 U2U Remote UE establishes/modifies a PC5-RRC connection with the selected L2 U2U Relay UE (i.e., as specified in TS 23.304 [48]).
2b. The L2 U2U Relay UE establishes/modifies a PC5-RRC connection with the peer L2 U2U Remote UE (i.e., as specified in TS 23.304 [48]).
3. The L2 U2U Relay UE allocates two local IDs and it is delivered via RRCReconfigurationSidelink message to each of the L2 U2U Remote UEs: one local ID to identify the L2 U2U Remote UE, the other local ID to identify the peer L2 U2U Remote UE. When the local ID is delivered, an L2 ID of the peer L2 U2U Remote UE is also delivered to the U2U Remote UE for making the association between the local ID and the L2 ID of the peer U2U Remote UE.
4. The L2 U2U Remote UE establishes end-to-end PC5-RRC connection with the peer L2 U2U Remote UE via the L2 U2U Relay UE. For the end-to-end connection establishment, fixed indexes (i.e., 0/1/2/3) are defined for end-to-end SL-SRB 0/1/2/3 respectively, and specified PC5 Relay RLC Channel configuration is used on each hop. The sidelink UE capability is exchanged between the L2 U2U Remote UEs via PC5-RRC (e.g., SL-SRB3) message.
5. The L2 U2U Remote UE sends to the L2 U2U Relay UE all the QoS profiles for the end-to-end QoS flows via PC5-RRC.
6. The L2 U2U Relay UE performs QoS split only for PDB.
NOTE: It is up to L2 U2U Relay UE implementation on how to split PDB.
7. The L2 U2U Relay UE sends the split QoS value (i.e., PDB) via PC5-RRC message to the L2 U2U Remote UE.
8. The L2 U2U Remote UE or the serving gNB of the L2 U2U Remote UE derives the PDCP and SDAP configuration for end-to-end SL-DRB and provides the portion of the configuration related to reception to the peer L2 U2U Remote UE using end-to-end RRCReconfigurationSidelink messages. The end-to-end bearer IDs for SL-SRB and SL-DRB are used as input for the L2 U2U Relay ciphering and deciphering at PDCP.
9a. The L2 U2U Remote UE or the serving gNB of the L2 U2U Remote UE derives the first hop configuration (e.g. PC5 Relay RLC Channel configuration) for SL-DRB and provides to the L2 U2U Relay UE of the configuration related to receiving on the first hop (i.e., Rx by the relay UE), using per-hop RRCReconfigurationSidelink message.
9b. The L2 U2U Relay UE or the serving gNB of the L2 U2U Relay UE derives the second hop configuration (e.g. PC5 Relay RLC Channel configuration) for each SL-DRB and provides to the peer L2 U2U Remote UE of the configuration related to receiving data packets on the second hop (i.e., RX by the peer remote UE), using per-hop RRCReconfigurationSidelink message.
10. The L2 U2U Remote UE and the peer L2 U2U Remote UE transmit or receive data via L2 U2U Relay UE.

3GPP Radio Resource Control (RRC) specification (TS 38.331) for Release 18 specifies sidelink RRC reconfiguration procedure, Sidelink radio bearer management, and PC5 Relay Radio Link Control (RLC) channel management as follows:

5.8.9.1 Sidelink RRC Reconfiguration
5.8.9.1.1 General

Figure 8:
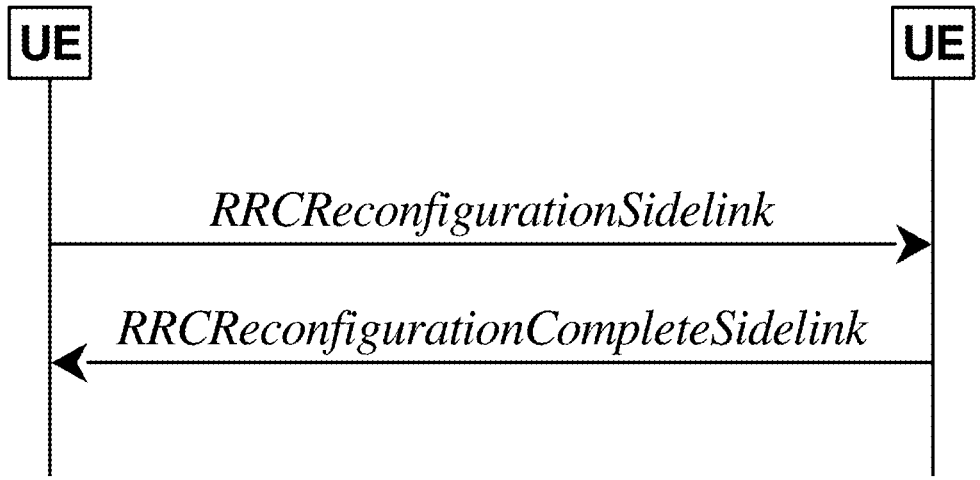
FIG. 8 is a reproduction of FIG. 5.8.9.1.1-1 of 3GPP TS 38.331 V18.0.0.

FIG. 5.8.9.1.1-1 of 3GPP TS 38.331 V18.0.0, Entitled "Sidelink RRC Reconfiguration, Successful", is Reproduced as FIG. 8

Figure 9:
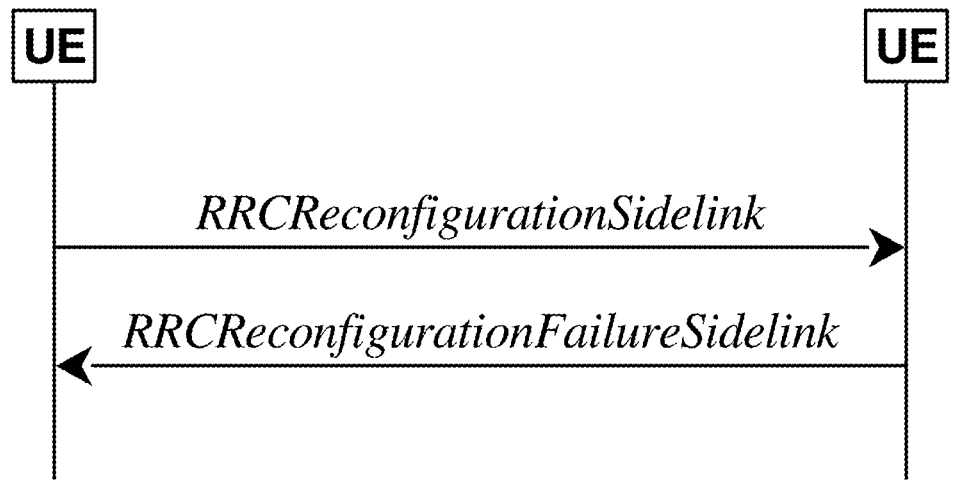
FIG. 9 is a reproduction of FIG. 5.8.9.1.1-2 of 3GPP TS 38.331 V18.0.0.

FIG. 5.8.9.1.1-2 of 3GPP TS 38.331 V18.0.0, Entitled "Sidelink RRC Reconfiguration, Failure", is Reproduced as FIG. 9

The purpose of this procedure is to modify a PC5-RRC connection, e.g. to establish/modify/release sidelink DRBs or additional sidelink RLC bearer or PC5 Relay RLC channels, to add/modify/release sidelink carrier, to (re-)configure NR sidelink measurement and reporting, to (re-)configure sidelink CSI reference signal resources, to (re)configure CSI reporting latency bound, to (re)configure sidelink DRX, to (re-)configure the latency bound of SL Inter-UE coordination report, and to indicate the SFN-DFN offset.
The UE may initiate the sidelink RRC reconfiguration procedure and perform the operation in clause 5.8.9.1.2 on the corresponding PC5-RRC connection in following cases:
  the release of sidelink DRBs associated with the peer UE, or L2 U2U Relay UE and peer L2 U2U Remote UE in case of L2 U2U Relay operation, as specified in clause 5.8.9.1a.1;
  the establishment of sidelink DRBs associated with the peer UE, or L2 U2U Relay UE and peer L2 U2U Remote UE in case of L2 U2U Relay operation, as specified in clause 5.8.9.1a.2;
  the modification for the parameters included in SLRB-Config of sidelink DRBs associated with the peer UE, as specified in clause 5.8.9.1a.2;
  the release of additional sidelink RLC bearer associated with the peer UE, as specified in clause 5.8.9.1a.5;
  the establishment of additional sidelink RLC bearer associated with the peer UE, as specified in clause 5.8.9.1a.6;
  the modification for the parameters included in SL-RLC-BearerConfig of additional sidelink RLC bearer associated with the peer UE, as specified in clause 5.8.9.1a.6;
  the release of PC5 Relay RLC channels for L2 U2N/U2U Relay UE and Remote UE, as specified in clause 5.8.9.7.1;
  the establishment of PC5 Relay RLC channels for L2 U2N/U2U Relay UE and Remote UE, as specified in clause 5.8.9.7.2;
  the modification for the parameters included in SL-RLC-ChannelConfigPC5 of PC5 Relay RLC channels for L2 U2N/U2U Relay UE and Remote UE, as specified in clause 5.8.9.7.2;
  the release of sidelink carrier associated with the peer UE, as specified in clause 5.8.9.1b.1;

the addition of sidelink carrier associated with the peer UE, as specified in clause 5.8.9.1b.2;

the modification of sidelink carrier associated with the peer UE, as specified in clause 5.8.9.1b.2;

the (re-)configuration of the peer UE to perform NR sidelink measurement and report.

the (re-)configuration of the sidelink CSI reference signal resources and CSI reporting latency bound;

the (re-)configuration of the peer UE to perform sidelink DRX;

the (re-)configuration of the latency bound of SL Inter-UE coordination report;

the (re-)configuration of the local UE ID for L2 U2U Remote UEs by L2 U2U Relay UE.

the response to the request in a RemoteUEInformationSidelink message for the SFN-DFN offset from the L2 U2N Remote UE;

the change in the value of the SFN-DFN offset at the L2 U2N Relay UE.

NOTE: It is up to L2 U2N Relay UE implementation to determine when the SFN-DFN offset has changed in value to a degree requiring an update to be sent to the L2 U2N Remote UE.

In RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the NR sidelink communications parameters provided in the old state.

5.8.9.1.2 Actions Related to Transmission of RRCReconfigurationSidelink Message

The UE shall set the contents of RRCReconfigurationSidelink message as follows:

1> for each sidelink DRB that is to be released, according to clause 5.8.9.1a.1.1, due to configuration by sl-ConfigDedicatedNR, SIB12, SidelinkPreconfigNR or by upper layers:
  2> set the entry included in the slrb-ConfigToReleaseList corresponding to the sidelink DRB;
1> for each sidelink DRB that is to be established or modified, according to clause 5.8.9.1a.2.1, due to receiving sl-ConfigDedicatedNR, SIB12 or SidelinkPreconfigNR:
  2> if the sidelink DRB is a per-hop sidelink DRB (i.e. the UE is not acting as a L2 U2U Remote UE):
    3> if a sidelink DRB is to be established:
      4> assign a new logical channel identity for the logical channel to be associated with the sidelink DRB and set sl-MAC-LogicalChannelConfigPC5 in the SLRB-Config to include the new logical channel identity;
    3> set the SLRB-Config included in the slrb-ConfigToAddModList, according to the received sl-RadioBearerConfig and sl-RLC-BearerConfig corresponding to the sidelink DRB;
  2> else if the sidelink DRB is an end-to-end sidelink DRB (i.e. the UE is acting as a L2 U2U Remote UE, and configure peer L2 U2U Remote UE with end-to-end SDAP and PDCP, or provide the L2 Relay UE with the QoS flow to end-to-end DRB mapping):
    3> if the UE is in RRC_CONNECTED:
      4> set the SLRB-Config included in the slrb-ConfigToAddModList, according to the received sl-RadioBearerConfig in sl-ConfigDedicatedNR;
    3> else if the UE is in RRC_IDLE/RRC_INACTIVE:
      4> set the SLRB-Config included in the slrb-ConfigToAddModList, which is derived by end-to-end QoS profile, according to the sl-RadioBearerConfig in SIB12;
    3> if the UE is out of coverage:
      4> set the SLRB-Config included in the slrb-ConfigToAddModList, which is derived by end-to-end QoS profile, according to the sl-RadioBearerConfig in SidelinkPreconfigNR;
1> for each additional sidelink RLC bearer that is to be released, according to clause 5.8.9.1a.5.1, due to configuration by sl-ConfigDedicatedNR, SIB12, SidelinkPreconfigNR or by upper layers:
  2> set the entry included in the sl-RLC-BearerToReleaseList corresponding to the additional sidelink RLC bearer;
1> for each additional sidelink RLC bearer that is to be established or modified, according to clause 5.8.9.1a.6.1, due to receiving sl-ConfigDedicatedNR, SIB12 or SidelinkPreconfigNR:
  2> if an additional sidelink RLC bearer is to be established:
    3> assign a new logical channel identity for the logical channel to be associated with the sidelink DRB and set sl-MAC-LogicalChannelConfigPC5 in the SL-RLC-BearerConfig to include the new logical channel identity;
  2> set the SL-RLC-BearerConfig included in the sl-RLC-BearerToAddModList, according to the received sl-RadioBearerConfig and sl-RLC-BearerConfig corresponding to the additional sidelink RLC bearer;
1> set the entry included in the sl-CarrierToReleaseList corresponding to the sidelink carrier(s) for which MAC entity indicates that the maximum number of consecutive HARQ DTX for a specific destination has been reached;
1> set the entry included in the sl-CarrierToAddModList corresponding to the sidelink carrier, taking into account of at least carrier(s) mapped to the sidelink QoS flow(s) configured by the upper layer, carriers configured in sl-ConfigDedicatedNR, SIB12 or SidelinkPreconfigNR, and carrier(s) supported by both UEs;
1> set the sl-MeasConfig as follows:
  2> If the frequency used for NR sidelink communication is included in sl-FreqInfoToAddModList/sl-FreqInfoToAddModListExt in sl-ConfigDedicatedNR within RRCReconfiguration message or included in sl-ConfigCommonNR within SIB12:
    3> if UE is in RRC_CONNECTED:
      4> set the sl-MeasConfig according to stored NR sidelink measurement configuration information for this destination;
    3> if UE is in RRC_IDLE or RRC_INACTIVE:
      4> set the sl-MeasConfig according to stored NR sidelink measurement configuration received from SIB12;

2> else:
3> set the sl-MeasConfig according to the sl-MeasPreConfig in SidelinkPreconfigNR;
1> set the sl-LatencyBoundlUC-Report;
1> start timer T400 for the destination;
1> set the sl-CSI-RS-Config;
1> set the sl-LatencyBoundCSI-Report;
1> set the sl-ResetConfig;
NOTE 1: Whether/how to set the parameters included in sl-LatencyBoundlUC-Report, sl-CSI-RS-Config, sl-LatencyBoundCSI-Report and sl-ResetConfig is up to UE implementation.
1> set the sl-DRX-ConfigUC-PC5 as follows:
2> If the frequency used for NR sidelink communication is included in sl-FreqInfoToAddModList/sl-FreqInfoToAddModListExt in sl-ConfigDedicatedNR within RRCReconfiguration message or included in sl-ConfigCommonNR within SIB12:
3> if UE is in RRC_CONNECTED and if sl-ScheduledConfig is included in sl-ConfigDedicatedNR within RRCReconfiguration:
4> set the sl-DRX-ConfigUC-PC5 according to stored NR sidelink DRX configuration information for this destination;
NOTE 2: If UE is in RRC_IDLE or in RRC_INACTIVE or out of coverage, or in RRC_CONNECTED and sl-UE-SelectedConfig is included in sl-ConfigDedicatedNR within RRCReconfiguration, it is up to UE implementation to set the sl-DRX-ConfigUC-PC5.
1> for each PC5 Relay RLC channel that is to be released due to configuration by sl-ConfigDedicatedNR:
2> set the SL-RLC-ChannelID corresponding to the PC5 Relay RLC channel in the sl-RLC-ChannelToReleaseListPC5;
1> for each PC5 Relay RLC channel that is to be established or modified due to receiving sl-ConfigDedicatedNR:
2> if a PC5 Relay RLC channel is to be established:
3> assign a new logical channel identity for the logical channel to be associated with the PC5 Relay RLC channel and set sl-MAC-LogicalChannelConfigPC5 in the SL-RLC-ChannelConfigPC5 to include the new logical channel identity;
2> set the SL-RLC-ChannelConfigPC5 included in the sl-RLC-ChannelToAddModListPC5 according to the received SL-RLC-ChannelConfig corresponding to the PC5 Relay RLC channel, including setting sl-RLC-ChannelID-PC5 to the same value of sl-RLC-ChannelID received in SL-RLC-ChannelConfig;
1> if the UE is operating as a L2 U2N Relay UE:
2> if the destination UE is a L2 U2N Remote UE that requested the SFN-DFN offset in a previous RemoteUEInformationSidelink message:
3> if the SFN-DFN offset has changed since a previous transmission of the RRCReconfigurationSidelink message, or no previous transmission of the RRCReconfigurationSidelink message has occurred since the reception of the RemoteUEInformationSidelink message:
4> set the sl-SFN-DFN-Offset according to the relation between the SFN timeline of the PCell and the DFN timeline;
1> if the UE is acting as L2 U2U Relay UE, and if the procedure is initiated to configure local ID to the connected L2 U2U Remote UEs:

2> if the local ID pair is to be assigned or modified for an end-to-end PC5 connetion, and if both the PC5-RRC connection with L2 U2U Remote UE and the PC5-RRC connection with peer L2 U2U Remote UE are successfully established:
3> include an entry in sl-LocalID-PairToAddModList, and set the fields as below:
4> according to association between User Info and L2 ID as specified in TS 23.304 [65], set sl-RemoteUE-LocalIdentity to include the new local UE ID, and set sl-RemoteUE-L2Identity to include the source L2 ID of L2 U2U Remote UE in the SL-SRAP-ConfigPC5, if needed;
4> according to association between User Info and L2 ID as specified in TS 23.304 [65], set sl-PeerRemoteUE-LocalIdentity to include the new local UE ID, and and set sl-PeerRemoteUE-L2Identity to include the destination L2 ID of peer L2 U2U Remote UE in the SL-SRAP-ConfigPC5, if needed;
2> else if the local ID pair is to be released for an end-to-end PC5 connetion:
3> include an entry in sl-LocalID-PairToReleaseList, with the value of SL-DestinationIdentity set to the destination L2 ID of the peer L2 U2U Remote UE;
1> if the UE is acting as L2 U2U Remote UE (i.e. Tx UE), and if the procedure is initiated to configure the first hop PC5 Relay RLC channel of an end-to-end sidelink DRB to the connected L2 U2N Relay UE (i.e. Rx UE), based on configuration in SIB12 or SidelinkPreconfigNR; or
1> if the UE is acting as L2 U2U Relay UE (i.e. Tx UE) and is in RRC_IDLE or in RRC_INACTIVE or OoC, and if the procedure is initiated to configure the second hop PC5 Relay RLC channel to the connected L2 U2N Remote UE (i.e. Rx UE) based on configuration in SIB12 or SidelinkPreconfigNR:
2> if a PC5 Relay RLC channel is to be established:
3> assign a new RLC channel ID and set sl-RLC-ChannelID-PC5 in the SL-RLC-ChannelConfigPC5 to include the new RLC channel ID;
3> assign a new logical channel identity for the logical channel to be associated with the PC5 Relay RLC channel and set sl-MAC-LogicalChannelConfigPC5 in the SL-RLC-ChannelConfigPC5 to include the new logical channel identity;
3> if the UE is in RRC_IDLE or in RRC_INACTIVE:
4> set the SL-RLC-ChannelConfigPC5 included in the sl-RLC-ChannelToAddModListPC5 according to the SL-RLC-BearerConfig derived based on the per-hop QoS of the end-to-end SLRB according to S/B12;
3> else if the UE is out of coverage:
4> set the SL-RLC-ChannelConfigPC5 included in the sl-RLC-ChannelToAddModListPC5 according to the SL-RLC-BearerConfig derived based on the per-hop QoS of the SLRB according to SidelinkPreconfigNR;
NOTE 3: If UE is in RRC_IDLE or in RRC_INACTIVE or out of coverage, how to merge the split per-flow QoS on the first/second hop into a per-SLRB level QoS for RLC channel configuration derivation is up to UE implementation.
The UE shall submit the RRCReconfigurationSidelink message to lower layers for transmission.

5.8.9.1.3 Reception of an RRCReconfigurationSidelink by the UE

The UE shall perform the following actions upon reception of the RRCReconfigurationSidelink:
1> if the RRCReconfigurationSidelink includes the sl-ResetConfig:
   2> perform the sidelink reset configuration procedure as specified in 5.8.9.1.10;
1> if the RRCReconfigurationSidelink includes the slrb-ConfigToReleaseList:
   2> for each entry value included in the slrb-ConfigToReleaseList that is part of the current UE sidelink configuration;
      3> perform the sidelink DRB release procedure, according to clause 5.8.9.1a.1;
1> if the RRCReconfigurationSidelink includes the slrb-ConfigToAddModList:
   2> for each sirb-PC5-ConfigIndex value included in the slrb-ConfigToAddModList that is not part of the current UE sidelink configuration:
      3> if sl-MappedQoS-FlowsToAddList is included:
         4> apply the SL-PQFI included in sl-MappedQoS-FlowsToAddList;
      3> perform the sidelink DRB addition procedure, according to clause 5.8.9.1a.2;
   2> for each sirb-PC5-ConfigIndex value included in the slrb-ConfigToAddModList that is part of the current UE sidelink configuration:
      3> if sl-MappedQoS-FlowsToAddList is included:
         4> add the SL-PQFI included in sl-MappedQoS-FlowsToAddList to the corresponding sidelink DRB;
      3> if sl-MappedQoS-FlowsToReleaseList is included:
         4> remove the SL-PQFI included in sl-MappedQoS-FlowsToReleaseList from the corresponding sidelink DRB;
      3> if the sidelink DRB release conditions as described in clause 5.8.9.1a.1.1 are met:
         4> perform the sidelink DRB release procedure according to clause 5.8.9.1a.1.2;
      3> else if the sidelink DRB modification conditions as described in clause 5.8.9.1a.2.1 are met:
         4> perform the sidelink DRB modification procedure according to clause 5.8.9.1a.2.2;
1> if the RRCReconfigurationSidelink includes the sl-RLC-BearerToReleaseList:
   2> for each entry value included in the sl-RLC-BearerToReleaseList that is part of the current UE sidelink configuration;
      3> perform the additional sidelink RLC bearer release procedure, according to clause 5.8.9.1a.5;
1> if the RRCReconfigurationSidelink includes the sl-RLC-BearerToAddModList:
   2> for each SL-RLC-BearerConfigIndex value included in the sl-RLC-BearerToAddModList that is not part of the current UE sidelink configuration:
      3> perform the additional sidelink RLC bearer addition procedure, according to clause 5.8.9.1a.6;
   2> for each SL-RLC-BearerConfigIndex value included in the sl-RLC-BearerToAddModList that is part of the current UE sidelink configuration:
      3> perform the additional sidelink RLC bearer modification procedure, according to clause 5.8.9.1a.6;
1> if the RRCReconfigurationSidelink includes the sl-CarrierToReleaseList:
   2> for each entry value included in the sl-CarrierToReleaseList that is part of the current UE sidelink configuration;
      3> perform the sidelink carrier release procedure, according to clause 5.8.9.1b.1;
1> if the RRCReconfigurationSidelink includes the sl-CarrierToAddModList:
   2> for each sl-Carrier-Id value included in the sl-CarrierToAddModList that is not part of the current UE sidelink configuration:
      3> perform the sidelink carrier addition procedure, according to clause 5.8.9.1b.2;
   2> for each sl-Carrier-Id value included in the sl-CarrierToAddModList that is part of the current UE sidelink configuration:
      3> perform the carrier modification procedure, according to clause 5.8.9.1b.2;
1> if the RRCReconfigurationSidelink message includes the sl-MeasConfig:
   2> perform the sidelink measurement configuration procedure as specified in 5.8.10;
1> if the RRCReconfigurationSidelink message includes the sl-CSI-RS-Config:
   2> apply the sidelink CSI-RS configuration;
1> if the RRCReconfigurationSidelink message includes the sl-LatencyBoundCSI-Report:
   2> apply the configured sidelink CSI report latency bound;
1> if the RRCReconfigurationSidelink includes the sl-RLC-ChannelToReleaseListPC5:
   2> for each SL-RLC-ChannelID value included in the sl-RLC-ChannelToReleaseListPC5 that is part of the current UE sidelink configuration;
      3> perform the PC5 Relay RLC channel release procedure, according to clause 5.8.9.7.1;
1> if the RRCReconfigurationSidelink includes the sl-RLC-ChannelToAddModListPC5:
   2> for each sl-RLC-ChannelID-PC5 value included in the sl-RLC-ChannelToAddModListPC5 that is not part of the current UE sidelink configuration:
      3> perform the PC5 Relay RLC channel addition procedure, according to clause 5.8.9.7.2;
   2> for each sl-RLC-ChannelID-PC5 value included in the sl-RLC-ChannelToAddModListPC5 that is part of the current UE sidelink configuration:
      3> perform the PC5 Relay RLC channel modification procedure according to clause 5.8.9.7.2;
1> if the RRCReconfigurationSidelink message includes the sl-DRX-ConfigUC-PC5; and
1> if the UE accepts the sl-DRX-ConfigUC-PC5:
   2> configure lower layers to perform sidelink DRX operation according to sl-DRX-ConfigUC-PC5 for the associated destination as defined in TS 38.321 [3];
1> if the RRCReconfigurationSidelink message includes the sl-LatencyBoundIUC-Report:
   2> apply the configured sidelink IUC report latency bound;
1> if the RRCReconfigurationSidelink message includes the sl-LocalID-PairToReleaseList or sl-LocalID-PairToAddModList:
   2> configure SRAP entity to perform NR sidelink L2 U2U relay operation accordingly for the end-to-end PC5 connection peer L2 U2U Remote UE as defined in TS 38.351 [65];

1> if the RRCReconfigurationSidelink message includes the sl-MappingToAddModListPC5 or sl-MappingToReleaseListPC5:
   2> configure lower layers to perform NR sidelink L2 U2U relay operation according to mapping between end-to-end sidelink bearer of L2 U2U Remote UE and egress PC5 Relay RLC channel as defined in TS 38.351 [65];

1> if the UE is unable to comply with (part of) the configuration included in the RRCReconfigurationSidelink (i.e. sidelink RRC reconfiguration failure):
   2> continue using the configuration used prior to the reception of the RRCReconfigurationSidelink message;
   2> set the content of the RRCReconfigurationFailureSidelink message;
      3> submit the RRCReconfigurationFailureSidelink message to lower layers for transmission;

1> if the RRCReconfigurationSidelink message includes the sl-SFN-DFN-Offset:
   2> if the sl-SFN-DFN-Offset is set to setup:
      3> apply the configured SFN-DFN time offset;
   2> if the sl-SFN-DFN-Offset is set to release:
      3> release the received sl-SFN-DFN-Offset;

1> else:
   2> set the content of the RRCReconfigurationCompleteSidelink message;
      3> if the UE rejects the sidelink DRX configuration sl-DRX-ConfigUC-PC5 received from the peer UE:
         4> include the sl-DRX-ConfigReject in the RRCReconfigurationCompleteSidelink message;
         4> consider no sidelink DRX to be applied for the corresponding sidelink unicast communication;
      3> submit the RRCReconfigurationCompleteSidelink message to lower layers for transmission;

NOTE 1: When the same logical channel is configured with different RLC mode by another UE, the UE handles the case as sidelink RRC reconfiguration failure.

NOTE 2: It is up to the UE implementation whether or not to indicate the rejection to the peer UE for a received sidelink DRX configuration.

[ . . . ]

5.8.9.1.9 Reception of an RRCReconfigurationCompleteSidelink by the UE

The UE shall perform the following actions upon reception of the RRCReconfigurationCompleteSidelink:
1> stop timer T400 for the destination, if running;
1> consider the configurations in the corresponding RRCReconfigurationSidelink message to be applied.
   2> if the RRCReconfigurationCompleteSidelink message includes the sl-DRX-ConfigReject:
      3> consider no sidelink DRX to be applied for the corresponding sidelink unicast communication;

[ . . . ]

5.8.9.1a Sidelink Radio Bearer Management
5.8.9.1a.1 Sidelink DRB Release
5.8.9.1a.1.1 Sidelink DRB Release Conditions For NR sidelink communication, a sidelink DRB release is initiated in the following cases:
1> for groupcast, broadcast and unicast, if slrb-Uu-ConfigIndex (if any) of the sidelink DRB is included in sl-RadioBearerToReleaseList in sl-ConfigDedicatedNR; or
1> for groupcast and broadcast, if no sidelink QoS flow with data indicated by upper layers is mapped to the sidelink DRB for transmission, which is (re)configured by receiving SIB12 or SidelinkPreconfigNR; or
1> for groupcast, broadcast and unicast, if SL-RLC-BearerConfigIndex (if any) of the associated RLC entity(ies) (i.e., including the additional sidelink RLC bearer if applicable) for the sidelink DRB is included in sl-RLC-BearerToReleaseList/sl-RLC-BearerToReleaseListSizeExt in sl-ConfigDedicatedNR; or
1> for unicast, if no sidelink QoS flow with data indicated by upper layers is mapped to the sidelink DRB for transmission, which is (re)configured by receiving SIB12 or SidelinkPreconfigNR, and if no sidelink QoS flow mapped to the sidelink DRB, which is (re)configured by receiving RRCReconfigurationSidelink, has data; or
1> for unicast, if SLRB-PC5-ConfigIndex (if any) of the sidelink DRB is included in slrb-ConfigToReleaseList in RRCReconfigurationSidelink or if sl-ResetConfig is included in RRCReconfigurationSidelink; or
1> for unicast, when the corresponding PC5-RRC connection is released due to sidelink RLF being detected, according to clause 5.8.9.3; or
1> for unicast, when the corresponding PC5-RRC connection is released due to upper layer request according to clause 5.8.9.5.

5.8.9.1a.1.2 Sidelink DRB Release Operations

For each sidelink DRB, whose sidelink DRB release conditions are met as in clause 5.8.9.1a.1.1, the UE capable of NR sidelink communication that is configured by upper layers to perform NR sidelink communication shall:
1> for groupcast and broadcast; or
1> for unicast, if the sidelink DRB release was triggered after the reception of the RRCReconfigurationSidelink message; or
1> for unicast, after receiving the RRCReconfigurationCompleteSidelink message, if the sidelink DRB release was triggered due to the configuration received within the sl-ConfigDedicatedNR, SIB12, SidelinkPreconfigNR or indicated by upper layers:
   2> release the PDCP entity for NR sidelink communication associated with the sidelink DRB;
   2> if SDAP entity for NR sidelink communication associated with this sidelink DRB is configured:
      3> indicate the release of the sidelink DRB to the SDAP entity associated with this sidelink DRB (TS 37.324 [24], clause 5.3.3);
   2> release SDAP entities for NR sidelink communication, if any, that have no associated sidelink DRB as specified in TS 37.324 [24] clause 5.1.2;
1> for groupcast and broadcast; or
1> for unicast, after receiving the RRCReconfigurationCompleteSidelink message, if the sidelink DRB release was triggered due to the configuration received within the sl-ConfigDedicatedNR:
   2> for each sl-RLC-BearerConfigIndex included in the received sl-RLC-BearerToReleaseList/sl-RLC-BearerToReleaseListSizeExt that is part of the current UE sidelink configuration:
      3> release the RLC entity and the corresponding logical channel for NR sidelink communication, associated with the sl-RLC-BearerConfigIndex.
1> for unicast, if the sidelink DRB release was triggered due to the reception of the RRCReconfigurationSidelink message; or 1> for unicast, after receiving the RRCReconfigurationCompleteSidelink message, if the sidelink DRB release was triggered due to the configuration received within the SIB12, SidelinkPreconfigNR or indicated by upper layers:
  2> release the RLC entity and the corresponding logical channel for NR sidelink communication associated with the sidelink DRB;
  2> perform the sidelink UE information procedure in clause 5.8.3 for unicast if needed.
1> if the sidelink radio link failure is detected for a specific destination:
  2> release the PDCP entity, RLC entity and the logical channel of the sidelink DRB for the specific destination.

Editor's Note: FFS on how to release SL DRB on E2E and hop configuration for U2U relay.

5.8.9.1a.2 Sidelink DRB Addition/Modification 5.8.9.1a.2.1 Sidelink DRB Addition/Modification Conditions For NR sidelink communication, a sidelink DRB addition is initiated only in the following cases:
1> if any sidelink QoS flow is (re)configured by sl-ConfigDedicatedNR, SIB12, SidelinkPreconfigNR and is to be mapped to one sidelink DRB, which is not established; or
1> if any sidelink QoS flow is (re)configured by RRCReconfigurationSidelink and is to be mapped to a sidelink DRB, which is not established;

For NR sidelink communication, a sidelink DRB modification is initiated only in the following cases:
1> if any of the sidelink DRB related parameters is changed by sl-ConfigDedicatedNR, SIB12, SidelinkPreconfigNR or RRCReconfigurationSidelink for one sidelink DRB, which is established;

5.8.9.1a.2.2 Sidelink DRB Addition/Modification Operations

For the sidelink DRB, whose sidelink DRB addition conditions are met as in clause 5.8.9.1a.2.1, the UE capable of NR sidelink communication that is configured by upper layers to perform NR sidelink communication shall:
1> for groupcast and broadcast; or
1> for unicast, if the sidelink DRB addition was triggered due to the reception of the RRCReconfigurationSidelink message; or
1> for unicast, after receiving the RRCReconfigurationCompleteSidelink message, if the sidelink DRB addition was triggered due to the configuration received within the sl-ConfigDedicatedNR, SIB12, SidelinkPreconfigNR or indicated by upper layers:
  2> if an SDAP entity for NR sidelink communication associated with the destination and the cast type of the sidelink DRB does not exist:
    3> establish an SDAP entity for NR sidelink communication as specified in TS 37.324 [24] clause 5.1.1;
  2> (re)configure the SDAP entity in accordance with the sl-SDAP-ConfigPC5 received in the RRCReconfigurationSidelink or sl-SDAP-Config received in sl-ConfigDedicatedNR, SIB12, SidelinkPreconfigNR, associated with the sidelink DRB;
  2> establish a PDCP entity for NR sidelink communication and configure it in accordance with the sl-PDCP-ConfigPC5 received in the RRCReconfigurationSidelink or sl-PDCP-Config received in sl-ConfigDedicatedNR, SIB12, SidelinkPreconfigNR, associated with the sidelink DRB;
  2> for a per-hop sidelink DRB (i.e. the UE is not acting as L2 U2U Remote UE):
    3> establish a RLC entity for NR sidelink communication and configure it in accordance with the sl-RLC-ConfigPC5 received in the RRCReconfigurationSidelink or sl-RLC-Config received in sl-ConfigDedicatedNR, SIB12, SidelinkPreconfigNR, associated with sidelink DRB;
    3> if this procedure was due to the reception of a RRCReconfigurationSidelink message:
      4> configure the MAC entity with a logical channel in accordance with the sl-MAC-LogicalChannelConfigPC5 received in the RRCReconfigurationSidelink associated with the sidelink DRB, and perform the sidelink UE information procedure in clause 5.8.3 for unicast if need;
    3> else if this procedure was due to the reception of a RRCReconfigurationCompleteSidelink message:
      4> configure the MAC entity with a logical channel associated with the sidelink DRB, in accordance with the sl-MAC-LogicalChannelConfig received in the sl-ConfigDedicatedNR, SIB12, SidelinkPreconfigNR;
    3> else (i.e. for groupcast/broadcast):
      4> configure the MAC entity with a logical channel associated with the sidelink DRB, in accordance with the sl-MAC-LogicalChannelConfig received in the sl-ConfigDedicatedNR, SIB12, SidelinkPreconfigNR and assign a new LCID to this logical channel.
  2> for an end-to-end sidelink DRB (i.e. the UE is acting as L2 U2U Remote UE):
    3> if the UE is in RRC_CONNECTED:
      4> associate this end-to-end sidelink DRB with the PC5 RLC channel indicated by sl-EgressRLC-ChannelPC5 included in sl-ConfigDedicatedNR, received from RRCReconfiguration;
    3> else if the UE is in RRC_IDLE or RRC_INACTIVE:
      4> associate this end-to-end sidelink DRB with the PC5 RLC channel derived by per-SLRB QoS profile of this end-to-end sidelink DRB based on the configuration in SIB12;
    3> else if the UE is out of coverage:
      4> associate this end-to-end sidelink DRB with the PC5 RLC channel derived by per-SLRB QoS profile of this end-to-end sidelink DRB based on the configuration in SidelinkPreconfigNR;

NOTE 1: When a sidelink DRB addition is due to the configuration by RRCReconfigurationSidelink, it is up to UE implementation to select the sidelink DRB configuration as necessary transmitting parameters for the sidelink DRB, from the received sl-ConfigDedicatedNR (if in RRC_CONNECTED), SIB12 (if in RRC_IDLE/INACTIVE), SidelinkPreconfigNR (if out of coverage) with the same RLC mode as the one configured in RRCReconfigurationSidelink.

For the sidelink DRB, whose sidelink DRB modification conditions are met as in clause 5.8.9.1a.2.1, the UE capable of NR sidelink communication that is configured by upper layers to perform NR sidelink communication shall:

1> for groupcast and broadcast; or
1> for unicast, if the sidelink DRB modification was triggered due to the reception of the RRCReconfigurationSidelink message; or
1> for unicast, after receiving the RRCReconfigurationCompleteSidelink message, if the sidelink DRB modification was triggered due to the configuration received within the sl-ConfigDedicatedNR, SIB12 or SidelinkPreconfigNR:
  2> reconfigure the SDAP entity of the sidelink DRB, in accordance with the sl-SDAP-ConfigPC5 received in the RRCReconfigurationSidelink or sl-SDAP-Config received in sl-ConfigDedicatedNR, SIB12, SidelinkPreconfigNR, if included;
  2> reconfigure the PDCP entity of the sidelink DRB, in accordance with the sl-PDCP-ConfigPC5 received in the RRCReconfigurationSidelink or s-PDCP-Config received in sl-ConfigDedicatedNR, SIB12, SidelinkPreconfigNR, if included;
  2> reconfigure the RLC entity of the sidelink DRB, in accordance with the sl-RLC-ConfigPC5 received in the RRCReconfigurationSidelink or sl-RLC-Config received in sl-ConfigDedicatedNR, SIB12, SidelinkPreconfigNR, if included;
  2> reconfigure the logical channel of the sidelink DRB, in accordance with the sl-MAC-LogicalChannelConfigPC5 received in the RRCReconfigurationSidelink or sl-MAC-LogicalChannelConfig received in sl-ConfigDedicatedNR, SIB12, SidelinkPreconfigNR, if included. [ . . . ]

5.8.9.7 PC5 Relay RLC Channel Management for L2 U2N or U2U Relay
5.8.9.7.1 PC5 Relay RLC Channel Release
The UE shall:
1> if the PC5 Relay RLC channel release was triggered after the reception of the RRCReconfigurationSidelink message; or
1> after receiving the RRCReconfigurationCompleteSidelink message, if the PC5 Relay RLC channel release was triggered due to the configuration received within the sl-ConfigDedicatedNR; or
1> for unicast in L2 U2U relay operation, if there is no end-to-end sidelink DRB(s) associated with this RLC channel:
  2> for each SL-RLC-ChannelID in sl-RLC-ChannelToReleaseList received in sl-ConfigDedicatedNR within RRCReconfiguration, or for each SL-RLC-ChannelID included in the received sl-RLC-ChannelToReleaseListPC5 that is part of the current UE sidelink configuration, or for the RLC channel to be released:
    3> release the RLC entity and the corresponding logical channel associated with the SL-RLC-ChannelID;
1> if the PC5 Relay RLC channel release was triggered for a specific destination by upper layers as specified in 5.8.9.5, or for a specific destination corresponding to the received sl-DestinationIdentityRemoteUE by upper layers as specified in 5.8.9.10.4, or due to sidelink RLF as specified in 5.8.9.3:
  2> release the RLC entity and the corresponding logical channel associated with the SL-RLC-ChannelID of the specific destination;

5.8.9.7.2 PC5 Relay RLC Channel Addition/Modification
Upon PC5-RRC connection establishment between the L2 U2N Relay UE and L2 U2N Remote UE, the L2 U2N Relay UE shall:
  1> establish a SRAP entity as specified in TS 38.351 [66], if no SRAP entity has been established;
  1> apply RLC specified configuration of SL-RLC0 as specified in clause 9.1.1.4:
  1> apply RLC default configuration of SL-RLC1 as defined in clause 9.2.4 if the L2 U2N Relay UE is in RRC_IDLE/INACTIVE state;
Upon PC5-RRC connection establishment between the L2 U2U Remote UE and L2 U2U Relay UE, and PC5-RRC connection establishment between the L2 U2U Relay UE and peer L2 U2U Remote UE, the L2 U2U Remote UE or L2 U2U Relay UE shall:
  1> establish a SRAP entity as specified in TS 38.351 [66], if no SRAP entity has been established;
  1> apply RLC specified configuration of SL-U2U-RLC as specified in clause 9.1.1.4;
The UE shall:
  1> if the PC5 Relay RLC channel addition/modification was triggered due to the reception of the RRCReconfigurationSidelink message; or
  1> after receiving the RRCReconfigurationCompleteSidelink message, if the PC5 Relay RLC channel addition/modification was triggered due to the configuration received within the sl-ConfigDedicatedNR; or
  1> after receiving the RRCReconfigurationCompleteSidelink message, if the PC5 Relay RLC channel addition/modification was triggered for an end-to-end sidelink DRB based on the configuration in SIB12 or SidelinkPreconfigNR:
    2> if the current configuration contains a PC5 Relay RLC channel with the received sl-RLC-ChannelID or sl-RLC-ChannelID-PC5; or
    2> if the configuration in SIB12 or SidelinkPreconfigNR has updated, based on which the PC5 Relay RLC channel is derived:
      3> reconfigure the sidelink RLC entity in accordance with the received sl-RLC-Config or sl-RLC-ConfigPC5;
      3> reconfigure the sidelink MAC entity with a logical channel in accordance with the received sl-MAC-LogicalChannelConfig or sl-MAC-LogicalChannelConfigPC5;
    2> else (a PC5 Relay RLC channel with the received sl-RLC-ChannelID or s-RLC-ChannelID-PC5 was not configured before):
      3> establish a sidelink RLC entity in accordance with the received sl-RLC-Config (in sl-ConfigDedicatedNR, or SIB12, or SidelinkPreconfigNR) or sl-RLC-ConfigPC5;
      3> configure the sidelink MAC entity with a logical channel in accordance with the received sl-MAC-LogicalChannelConfig or sl-MAC-LogicalChannelConfigPC5.

Figure 10:
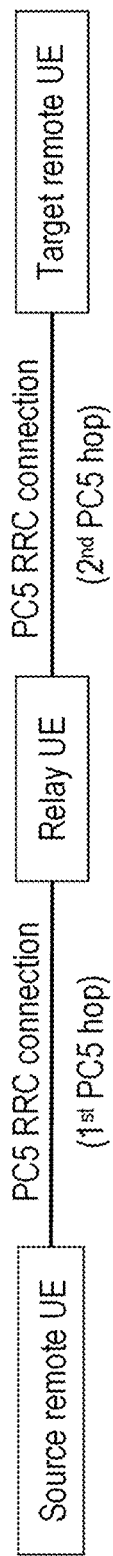
FIG. 10 illustrates PC5 RRC connections for UE-to-UE Relay according to one exemplary embodiment.

Issue RIL H693 was raised during R18 ASN1 Review to address an issue on E2E SLRB to QoS mapping as follows:
[RIL]: H693 [Delegate]: Huawei (Rui Wang) [WI]: SLrelay [Class]:2 [Status]: ToDo [TDoc]: R2-24xxxxx [Proposed Conclusion]: v032
[Description]: In L2 U2U, source UE needs to send E2E slrb to QoS mapping to relay UE for per-slrb derivation. The original intention is to reuse existing SDAP configuration to contain the mapping. However, the PQFI can not distinguish different destination UE/E2E connection in U2U. The solution thus we propose to introduce new field/IE for U2U.
[Proposed Change]:
Proposed solution: to introduce new field/Types, using QoS flow ID to imply the link to different destination ID. If more discussion is needed, we can bring discussion paper with TP to cover the changes to procedural text and asn.1.
The change is like below:
RRCReconfigurationSidelink-v1800-IEs SEQUENCE {
...
    sl-LocalID-PairToReleaseList-r18 SEQUENCE (SIZE (1 . . . maxNrofSL-Dest-r16)) OF SL-Destination-Identity-r16 OPTIONAL, —Need N
    sl-LocalID-PairToAddModList-r18 SEQUENCE (SIZE (1 . . . maxNrofSL-Dest-r16)) OF SL-SRAP-ConfigPC5-r18 OPTIONAL, —Need N
    slrb-MappingConfigToAddModList-r18 SEQUENCE (SIZE (1 . . . maxNrofSLRB-r16)) OF SLRB-MappingConfig-r18 OPTIONAL, —Need N
    slrb-MappingConfigToReleaseList-r18 SEQUENCE (SIZE (1 . . . maxNrofSLRB-r16)) OF SLRB-PC5-ConfigIndex-r18 OPTIONAL, —Need N
    nonCriticalExtension SEQUENCE { } OPTIONAL
}
SLRB-MappingConfig-r18::=SEQUENCE {
    slrb-PC5-ConfigIndexU2U-r18 SLRB-PC5-ConfigIndex-r16,
    sl-MappedQoS-FlowsToAddListU2U-r18
        SEQUENCE (SIZE (1 . . . maxNrofSL-QFIsPerDest-r16)) OF SL-QoS-FlowIdentity-r16 OPTIONAL, —Need N
    sl-MappedQoS-FlowsToReleaseListU2U-r18
        SEQUENCE (SIZE (1 . . . maxNrofSL-QFIsPerDest-r16)) OF SL-QoS-FlowIdentity-r16 OPTIONAL, —Need N
    [ . . . ]
}
[Comments]:

The UE-to-UE (U2U) Relay is introduced into 3GPP Release 18, where a relay UE is used to support communication between two remote UEs in case these two remote UEs cannot communicate with each other directly due to beyond radio coverage. The relay UE needs to establish one PC5 RRC connection (or PC5 unicast link) with each of a source remote UE (e.g. the first PC5 hop) and a target remote UE (e.g. the second PC5 hop) as shown in FIG. 10, which illustrates PC5 RRC connections for UE-to-UE Relay according to one exemplary embodiment. In addition, an end-to-end PC5 RRC connection may be established between these two remote UEs for Layer-2 (L2) U2U Relay. It is possible that the source remote UE may communicate with multiple target remote UEs via the same relay UE.

For a L2 remote UE connecting with another L2 remote UE via a L2 relay UE, the end-to-end Quality of Service (QoS) requirement of the relay traffic between the peer L2 remote UEs can be satisfied by the corresponding QoS control for the PC5 RRC connection between L2 source remote UE and L2 relay UE (i.e. first hop PC5 QoS control) and the QoS control for the PC5 RRC connection between L2 relay UE and L2 target remote UE (i.e. second hop PC5 QoS control).

To achieve that, the source remote UE and the target remote UE may firstly negotiate the end-to-end QoS requirement for a new PC5 QoS flow. And then, the source remote UE may provide the end-to-end QoS requirement (e.g. QoS profile) to the relay UE so that the relay UE can split the Packet Delay Budget (PDB) into one PDB value for the first hop and the other PDB value for the second hop. The relay UE may then provide the split PDB value for the first hop to the source remote UE so that the source remote UE can determine, according to at least the split PDB value received from the relay UE, an end-to-end (E2E) SL DRB configuration and a PC5 Relay RLC channel configuration (used for transmitting data packets of the PC5 QoS flow for the target remote UE to the relay UE over the first hop) and then provide the receiving (Rx) RLC parameters of the PC5 Relay RLC channel configuration to the relay UE (e.g. via a RRC Reconfiguration Sidelink message) so that the relay UE can receive the data packets of the PC5 QoS flow from the source remote UE on the PC5 Relay RLC channel.

In addition, the relay UE may determine the other PC5 Relay RLC channel configuration for the second hop according to the other split PDB value(s) for the second hop (e.g. per SLRB QoS profile) and then provide the Rx RLC parameters of the PC5 Relay RLC channel configuration to the target remote UE (e.g. via another RRC Reconfiguration Sidelink message) so as to forward the data packets of the PC5 QoS flow to the target remote UE on the PC5 Relay RLC channel over the second hop.

Basically, different E2E SL-DRBs towards the same target remote UE or different target remote UEs may be multiplexed, by the source remote UE, to the same PC5 Relay RLC channel for transmission. Thus, an end-to-end PC5 Radio Bearer ID (E2E SL DRB ID), a local UE ID of the source remote UE, and a local UE ID of the target remote UE are included in the header of an SRAP PDU (used for transmitting the data packet) in order for the relay UE to determine the egress PC5 Relay RLC channel for forwarding the data packet and also for the target remote UE to correlate the received data packet for the specific PDCP entity associated with the right E2E SL DRB of the target remote UE. To support that, the source remote UE needs to maintain the mapping between E2E SL DRBs and the egress PC5 Relay RLC channel over the first hop between the source remote UE and the relay UE for each target remote UE. Also, the relay UE needs maintain the mapping between E2E SL DRBs and the egress PC5 Relay RLC channel over the second hop between the relay UE and the target remote UE for each source-target remote UE pair. The local UE IDs of the remote UEs may be allocated by the relay UE. FIG. 16.12.7-1 (reproduced as FIG. 7) of 3GPP TS 38.300 V18.0.0 illustrates the above concepts.

Figure 11:
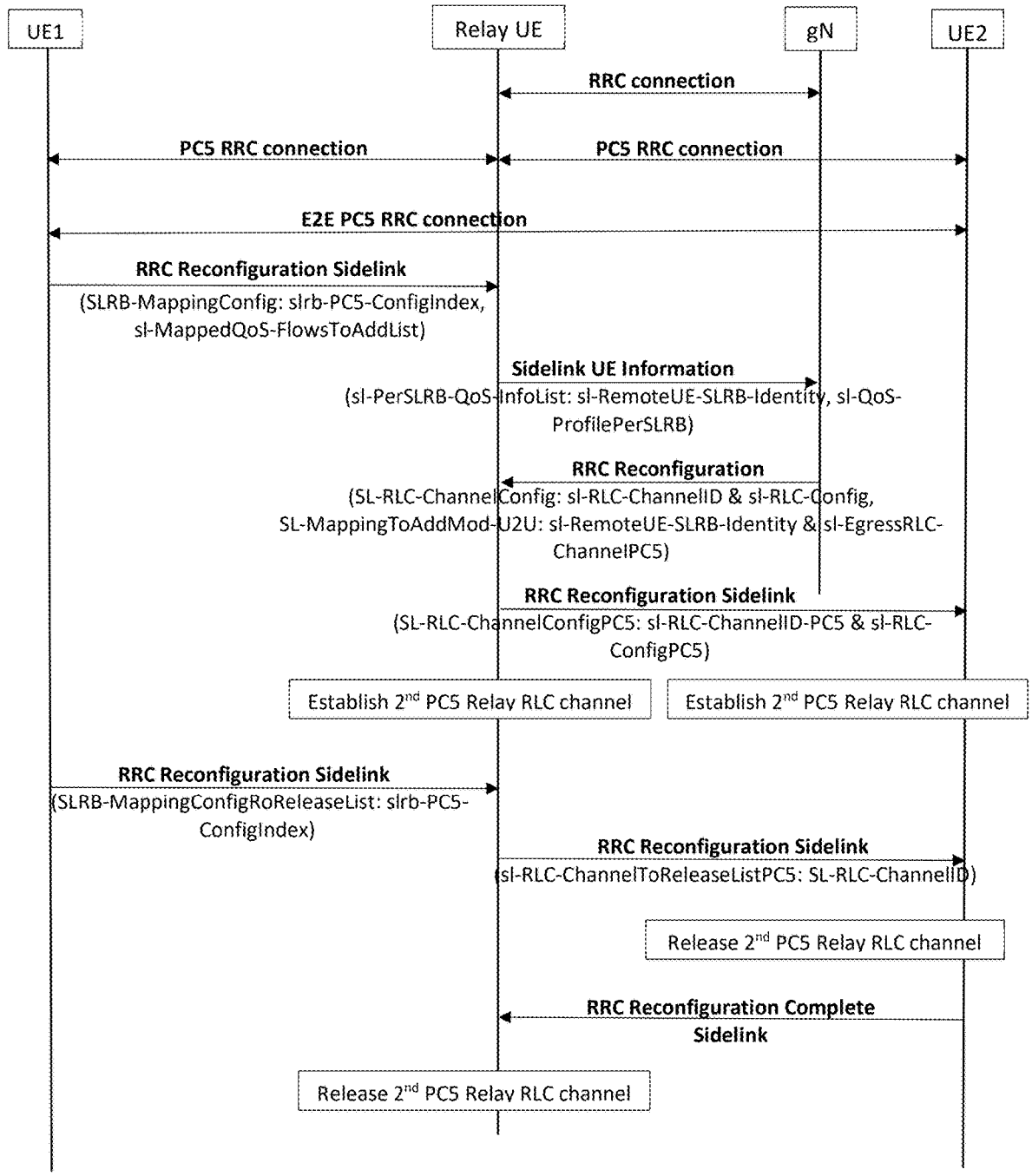
FIG. 11 shows an example of handling SLRB mapping configuration release according to one exemplary embodiment.

RIL H693 further proposes to add a new information element (IE) slrb-MappingConfigToAddModList for a source remote UE to send a list of PC5 QoS flow-to-SLRB mappings to the relay UE so that the relay UE can derive per SLRB QoS profile for each SLRB in the list to determine the PC5 Relay RLC channel configuration for the SLRB. Another IE slrb-MappingConfigToReleaseList is also introduced for the source remote UE to release the PC5 QoS flow-to-SLRB mappings. Each entry in the list includes an SLRB-PC5-ConfigIndex indicating an E2E SLRB. It is not clear how the relay reacts in response to reception of the slrb-MappingConfigToReleaseList. The source remote UE needs to send the slrb-MappingConfigToReleaseList to the relay UE to release the related PC5 QoS flow-to-SLRB mapping when an E2E SLRB is released. In this situation, the relay UE should notify the target remote UE to release a PC5 Relay RLC channel, on the second hop, associated with the E2E SLRB indicated in the slrb-MappingConfigToReleaseList if there is no other E2E SL DRB associated with the PC5 Relay RLC channel. FIG. 11 illustrates an example of the above solution. In particular, FIG. 11 shows an example of handling SLRB mapping configuration release according to one exemplary embodiment.

Figure 12:
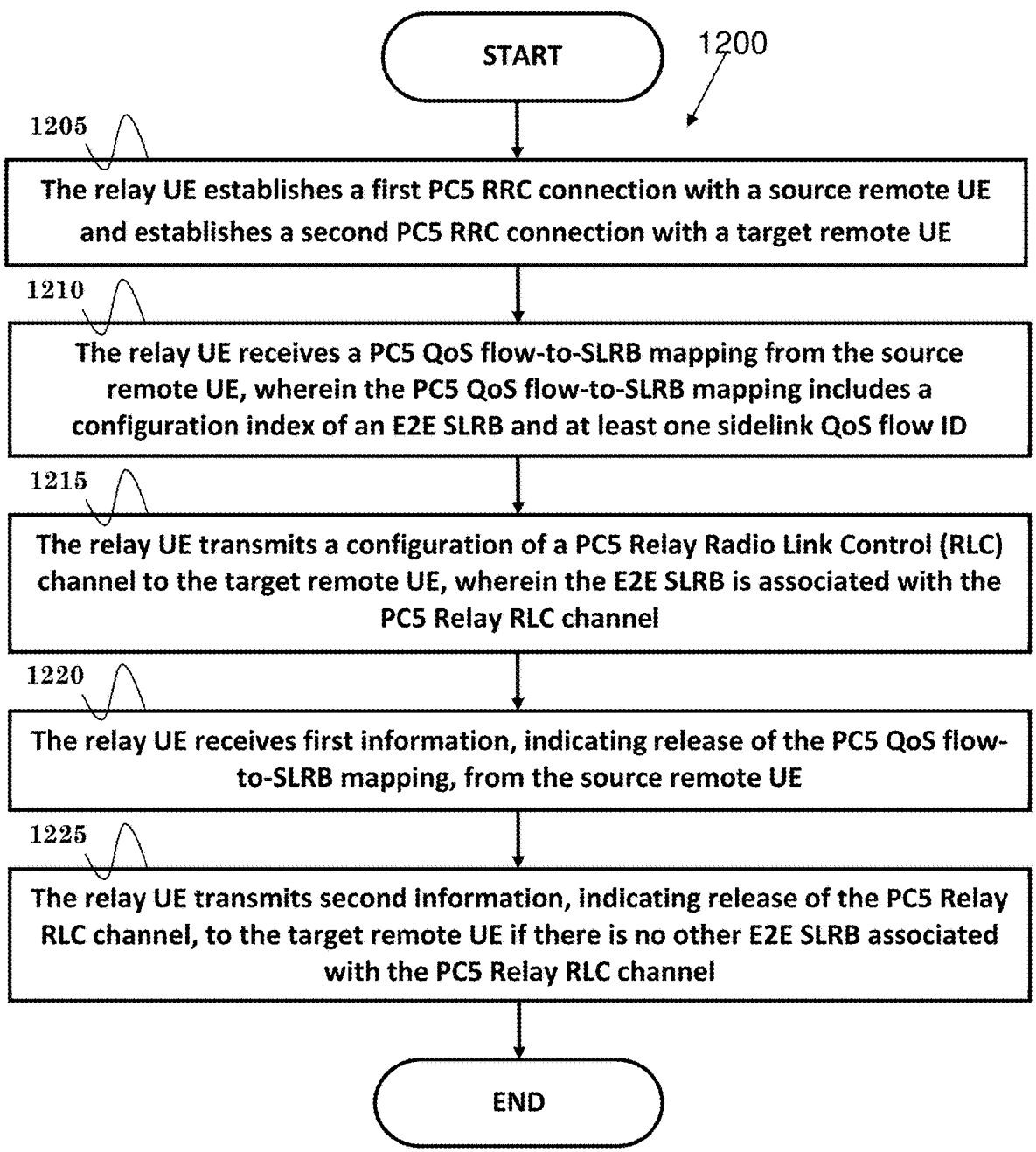
FIG. 12 is a flow chart according to one exemplary embodiment.

FIG. 12 is a flow chart 1200 for a relay User Equipment (UE). In step 1205, the relay UE establishes a first PC5 Radio Resource Control (RRC) connection with a source remote UE and establishes a second PC5 RRC connection with a target remote UE. In step 1210, the relay UE receives a PC5 Quality of Service (QoS) flow-to-Sidelink Radio Bearer (SLRB) mapping from the source remote UE, wherein the PC5 QoS flow-to-SLRB mapping includes a configuration index of an End-to-End (E2E) SLRB and at least one sidelink QoS flow identity (ID). In step 1215, the relay UE transmits a configuration of a PC5 Relay Radio Link Control (RLC) channel to the target remote UE, wherein the E2E SLRB is associated with the PC5 Relay RLC channel. In step 1220, the relay UE receives first information, indicating release of the PC5 QoS flow-to-SLRB mapping, from the source remote UE. In step 1225, the relay UE transmits second information, indicating release of the PC5 Relay RLC channel, to the target remote UE if there is no other E2E SLRB associated with the PC5 Relay RLC channel.

In one embodiment, release of the PC5 QoS flow-to-SLRB mapping could imply that the E2E SLRB is released. The relay UE could establish the PC5 Relay RLC channel in response to reception of a RRC Reconfiguration message from a network node to configure the PC5 Relay RLC channel. The relay UE could derive a per SLRB QoS profile for the E2E SLRB according to QoS information of PC5 QoS flow(s) identified by the at least one sidelink QoS flow identity (ID). The relay UE could determine the configuration of the PC5 Relay RLC channel for the E2E SLRB based on the per SLRB QoS profile for the E2E SLRB.

In one embodiment, the configuration of the PC5 Relay RLC channel may be included in a first RRC Reconfiguration Sidelink message. The second information may be included in a second RRC Reconfiguration Sidelink message.

In one embodiment, the relay UE could release the PC5 Relay RLC channel after receiving a RRC Reconfiguration Complete Sidelink message from the target remote UE.

Referring back to FIGS. 3 and 4, in one exemplary embodiment from the perspective of a relay UE. The relay UE 300 includes a program code 312 stored in the memory 310. The CPU 308 could execute program code 312 to enable the relay UE (i) to establish a first PC5 Radio Resource Control (RRC) connection with a source remote UE and establishes a second PC5 RRC connection with a target remote UE, (ii) to receive a PC5 Quality of Service (QoS) flow-to-Sidelink Radio Bearer (SLRB) mapping from the source remote UE, wherein the PC5 QoS flow-to-SLRB mapping includes a configuration index of an End-to-End (E2E) SLRB and at least one sidelink QoS flow identity (ID), (iii) to transmit a configuration of a PC5 Relay Radio Link Control (RLC) channel to the target remote UE, wherein the E2E SLRB is associated with the PC5 Relay RLC channel, (iv) to receive first information, indicating release of the PC5 QoS flow-to-SLRB mapping, from the source remote UE, and (v) to transmit second information, indicating release of the PC5 Relay RLC channel, to the target remote UE if there is no other E2E SLRB associated with the PC5 Relay RLC channel. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a relay User Equipment (UE), comprising:
   the relay UE establishes a first PC5 Radio Resource Control (RRC) connection with a source remote UE and establishes a second PC5 RRC connection with a target remote UE;
   the relay UE receives a PC5 Quality of Service (QoS) flow-to-Sidelink Radio Bearer (SLRB) mapping from the source remote UE after the first PC5 RRC connection between the relay UE and the source remote UE has been established, wherein the PC5 QoS flow-to-SLRB mapping includes a configuration index of an End-to-End (E2E) SLRB and at least one sidelink QoS flow identity (ID);
   the relay UE transmits a configuration of a PC5 Relay Radio Link Control (RLC) channel to the target remote UE after the second PC5 RRC connection between the relay UE and the target remote UE has been established, wherein the E2E SLRB is associated with the PC5 Relay RLC channel;
   the relay UE receives first information, indicating release of the PC5 QoS flow-to-SLRB mapping, from the source remote UE; and
   the relay UE transmits second information, indicating release of the PC5 Relay RLC channel, to the target remote UE when there is no other E2E SLRB associated with the PC5 Relay RLC channel.

2. The method of claim 1, wherein release of the PC5 QoS flow-to-SLRB mapping implies the E2E SLRB is released.

3. The method of claim 1, further comprising:
   the relay UE establishes the PC5 Relay RLC channel in response to reception of a RRC Reconfiguration message from a network node to configure the PC5 Relay RLC channel.

4. The method of claim 1, further comprising:
   the relay UE derives a per SLRB QoS profile for the E2E SLRB according to QoS information of PC5 QoS flow(s) identified by the at least one sidelink QoS flow identity (ID).

5. The method of claim 4, further comprising:
   the relay UE determines the configuration of the PC5 Relay RLC channel for the E2E SLRB based on the per SLRB QoS profile for the E2E SLRB.

6. The method of claim 1, wherein the configuration of the PC5 Relay RLC channel is included in a first RRC Reconfiguration Sidelink message.

7. The method of claim 1, wherein the second information is included in a second RRC Reconfiguration Sidelink message.

8. The method of claim 1, further comprising:
   the relay UE releases the PC5 Relay RLC channel after receiving a RRC Reconfiguration Complete Sidelink message from the target remote UE.

9. A relay User Equipment (UE), comprising:
   a control circuit;
   a processor installed in the control circuit; and
   a memory installed in the control circuit and operatively coupled to the processor;
   wherein the processor is configured to execute a program code stored in the memory to:
      establish a first PC5 Radio Resource Control (RRC) connection with a source remote UE and establishes a second PC5 RRC connection with a target remote UE;
      receive a PC5 Quality of Service (QoS) flow-to-Sidelink Radio Bearer (SLRB) mapping from the source remote UE after the first PC5 RRC connection between the relay UE and the source remote UE has been established, wherein the PC5 QoS flow-to-SLRB mapping includes a configuration index of an End-to-End (E2E) SLRB and at least one sidelink QoS flow identity (ID);
      transmit a configuration of a PC5 Relay Radio Link Control (RLC) channel to the target remote UE after the second PC5 RRC connection between the relay UE and the target remote UE has been established, wherein the E2E SLRB is associated with the PC5 Relay RLC channel;
      receive first information, indicating release of the PC5 QoS flow-to-SLRB mapping, from the source remote UE; and
      transmit second information, indicating release of the PC5 Relay RLC channel, to the target remote UE when there is no other E2E SLRB associated with the PC5 Relay RLC channel.

10. The relay UE of claim 9, wherein release of the PC5 QoS flow-to-SLRB mapping implies the E2E SLRB is released.

11. The relay UE of claim 9, wherein the processor is further configured to execute a program code stored in the memory to:

establish the PC5 Relay RLC channel in response to reception of a RRC Reconfiguration message from a network node to configure the PC5 Relay RLC channel.

12. The relay UE of claim 9, wherein the processor is further configured to execute a program code stored in the memory to:
   derive a per SLRB QoS profile for the E2E SLRB according to QoS information of PC5 QoS flow(s) identified by the at least one sidelink QoS flow identity (ID).

13. The relay UE of claim 12, wherein the processor is further configured to execute a program code stored in the memory to:
   determine the configuration of the PC5 Relay RLC channel for the E2E SLRB based on the per SLRB QoS profile for the E2E SLRB.

14. The relay UE of claim 9, wherein the configuration of the PC5 Relay RLC channel is included in a first RRC Reconfiguration Sidelink message.

15. The relay UE of claim 9, wherein the second information is included in a second RRC Reconfiguration Sidelink message.

16. The relay UE of claim 9, wherein the processor is further configured to execute a program code stored in the memory to:
   release the PC5 Relay RLC channel after receiving a RRC Reconfiguration Complete Sidelink message from the target remote UE.

* * * * *